(12) United States Patent
Wollenschlager et al.

(10) Patent No.: US 12,450,266 B2
(45) Date of Patent: Oct. 21, 2025

(54) SYSTEM AND METHOD FOR IDENTIFYING LOCATIONS WITH LIFESTYLE PREFERENCES

(71) Applicant: STATE FARM MUTUAL AUTOMOBILE INSURANCE COMPANY, Bloomington, IL (US)

(72) Inventors: Torri Wollenschlager, Bloomington, IL (US); Molly Vaughn, Bloomington, IL (US); John Lucas Bothwell, Bloomington, IL (US); Kristin E. Booth, Bloomington, IL (US); Tyler Haycraft, Rockwall, TX (US); Connor Lirot, Plano, TX (US); Bart Paul Pousson, Wylie, TX (US); Courtney Gerard Smith, McKinney, TX (US); Garrick Douglas Gabbrants, Bloomington, IL (US); James Joseph Mellinger, Allen, TX (US); Charles Allen Stokes, Richardson, TX (US); Tim Vernon, Nevada, TX (US); Anthony Todd Frazier, Wylie, TX (US); Thomas Clausing, McKinney, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 68 days.

(21) Appl. No.: 18/385,975

(22) Filed: Nov. 1, 2023

(65) Prior Publication Data
US 2024/0061870 A1    Feb. 22, 2024

Related U.S. Application Data

(63) Continuation-in-part of application No. 17/554,391, filed on Dec. 17, 2021, now Pat. No. 11,847,146, (Continued)

(51) Int. Cl.
*G06F 16/29* (2019.01)
*G06F 3/0482* (2013.01)
(Continued)

(52) U.S. Cl.
CPC ............ *G06F 16/29* (2019.01); *G06F 3/0482* (2013.01); *G06F 16/24578* (2019.01); *G06Q 50/167* (2013.01); *H04W 4/021* (2013.01)

(58) Field of Classification Search
CPC .. G06F 16/29; G06F 16/24578; G06F 3/0482; H04W 4/021; G06Q 50/167
See application file for complete search history.

(56) References Cited

U.S. PATENT DOCUMENTS

| 7,680,859 B2 * | 3/2010 | Schiller ................. G06Q 30/02 707/738 |
| 8,103,445 B2 | 1/2012 | Smith et al. |

(Continued)

OTHER PUBLICATIONS

"Color Coded Maps Community Analyst—Documentation", published on Jun. 28, 2016 to https://doc.arcgis.com/en/community-analyst/help/color-coded-maps.html, retrieved May 1, 2021 (Year: 2016).

(Continued)

*Primary Examiner* — Etienne P Leroux
(74) *Attorney, Agent, or Firm* — MARSHALL, GERSTEIN & BORUN LLP

(57) ABSTRACT

A method and system provide areas with lifestyle preferences selected by a user. Generally, a computing device receives a selection of one or more lifestyle preferences from the user. In response to the selected lifestyle preferences, a visual display of one or more areas of a geographic map that includes one or more of the lifestyle preferences that favorably compare to the lifestyle preferences of the user is presented to the user via a user interface of the (Continued)

computing device. Additionally, the user may submit a review of the lifestyle preferences available in a particular location.

20 Claims, 13 Drawing Sheets

Related U.S. Application Data which is a continuation of application No. 16/823,109, filed on Mar. 18, 2020, now Pat. No. 11,222,049.

(60) Provisional application No. 62/822,358, filed on Mar. 22, 2019.

(51) Int. Cl.
*G06F 3/04847* (2022.01)
*G06F 16/2457* (2019.01)
*G06F 16/9537* (2019.01)
*G06Q 50/16* (2024.01)
*H04W 4/021* (2018.01)

(56) References Cited

U.S. PATENT DOCUMENTS

| | | | |
|---|---|---|---|
| 8,484,199 | B1 | 7/2013 | Katragadda et al. |
| 9,194,716 | B1 | 11/2015 | Cutter |
| 9,338,308 | B1* | 5/2016 | Adams, Jr. .......... H04M 15/745 |
| 9,715,553 | B1 | 7/2017 | Singleton et al. |
| 10,108,693 | B2 | 10/2018 | Edecker et al. |
| 10,306,203 | B1 | 5/2019 | Goyal et al. |
| 10,616,362 | B2 | 4/2020 | Wang |
| 2002/0087408 | A1 | 7/2002 | Burnett |
| 2007/0011150 | A1 | 1/2007 | Frank |
| 2009/0043738 | A1 | 2/2009 | James et al. |
| 2009/0160873 | A1* | 6/2009 | Kew .................... G09B 29/007 |
| | | | 705/14.27 |
| 2010/0118025 | A1 | 5/2010 | Smith et al. |
| 2010/0211308 | A1* | 8/2010 | Zheng .................... G01C 21/20 |
| | | | 707/E17.05 |
| 2011/0137881 | A1 | 6/2011 | Cheng et al. |
| 2011/0270705 | A1 | 11/2011 | Parker |
| 2011/0313657 | A1 | 12/2011 | Myllymaki et al. |
| 2013/0290106 | A1 | 10/2013 | Bradley et al. |
| 2013/0339891 | A1 | 12/2013 | Blumenberg et al. |
| 2014/0095303 | A1 | 4/2014 | Jones et al. |
| 2014/0258285 | A1 | 9/2014 | Lavine |
| 2014/0280180 | A1 | 9/2014 | Edecker et al. |
| 2015/0074097 | A1 | 3/2015 | Lavine |
| 2015/0186414 | A1 | 7/2015 | Jones et al. |
| 2015/0186910 | A1 | 7/2015 | Cruickshank et al. |
| 2016/0162918 | A1* | 6/2016 | Bodo ................. G06Q 30/0205 |
| | | | 705/7.34 |
| 2016/0171585 | A1 | 6/2016 | Singh et al. |
| 2016/0299905 | A1* | 10/2016 | Geyer .................... G06F 16/248 |
| 2016/0371800 | A1 | 12/2016 | Kirshenboim |
| 2017/0293950 | A1 | 10/2017 | Rathod |
| 2017/0308622 | A1 | 10/2017 | Thornburgh |
| 2018/0113584 | A1 | 4/2018 | Varadi |
| 2019/0043145 | A1 | 2/2019 | Morgan |
| 2019/0101402 | A1 | 4/2019 | Chien et al. |
| 2019/0102791 | A1* | 4/2019 | Park ................. G06F 16/24568 |
| 2019/0213612 | A1 | 7/2019 | Maugans, III et al. |
| 2020/0065840 | A1* | 2/2020 | Pinel ...................... H04W 4/02 |
| 2020/0111268 | A1 | 4/2020 | Montague et al. |

OTHER PUBLICATIONS

Non-Final Office Action for U.S. Appl. No. 16/823,109 dated May 7, 2021.

Notice of Allowance for U.S. Appl. No. 16/823,109 dated Sep. 7, 2021.

Non-Final Office Action for U.S. Appl. No. 17/554,391 dated Feb. 9, 2023.

Final Office Action for U.S. Appl. No. 17/554,391 dated May 12, 2023.

Notice of Allowance for U.S. Appl. No. 17/554,391 dated Aug. 3, 2023.

* cited by examiner

SYSTEM AND METHOD FOR IDENTIFYING LOCATIONS WITH LIFESTYLE PREFERENCES

CROSS-REFERENCE TO RELATED APPLICATIONS

This application is a continuation of U.S. patent application Ser. No. 17/554,391 filed Dec. 17, 2021, which is a continuation of U.S. patent application Ser. No. 16/823,109 filed Mar. 18, 2020, which claims the benefit of U.S. Provisional Application No. 62/822,358, filed Mar. 22, 2019, which are incorporated by reference herein in their entireties.

TECHNICAL FIELD

The present disclosure generally relates to systems and methods for identifying geographic locations including desired and/or preferred lifestyles and, more particularly, for indicating such identified geographic locations, e.g., municipalities, counties, parishes, cities, towns, districts, boroughs, and neighborhoods, on an interactive digital map.

BACKGROUND

Individuals moving to a new residence often request the services of one or more realtors and/or use the internet and other reference materials to research prospective locations. Individuals may expend much effort treading through numerous reference materials to determine which are pertinent. The relocation research for moves to or within large cities can be difficult and the results may not be easily understood. For those relocating to an unfamiliar location, it would be beneficial to more easily evaluate their lifestyle preferences with the lifestyle data of potential locations.

SUMMARY

To provide interactive map data to a user, a software application of a computing device receives a selection of one or more lifestyle preferences from the user. In response to the selected lifestyle preferences, a visual display of one or more areas, e.g., regions, segments, etc.; of a geographic map that includes one or more of the lifestyle preferences that favorably compare to the lifestyle preferences of the user may ultimately be provided to the user via a user interface of the computing device. Additionally, the user may submit a review of the lifestyles available for a particular location.

More specifically, the software application includes one or more operating modes, such as a match operating mode, rate operating mode, etc. The match operating mode provides a map or list of ranked locations, e.g., areas, based on an analysis of the user's selection and prioritization of lifestyle preferences with classified lifestyle preference data of the prospective areas. The ranked areas indicate the compatibility, e.g., match quality, of a particular area with one or more user-selected lifestyle preferences. Categories of lifestyle preferences may include locales, schools, dependent care, food and drink, health and wellness, transportation information, shopping, entertainment, recreation, pet care, etc. Each lifestyle preference may further be defined into subcategories, for example, school subcategories may include pre-school, middle school, high school, public/private school, etc. Through prioritization of the various lifestyle preferences, the user may be made more aware of sought-after lifestyle preferences, which may facilitate searching for locales that are compatible with a desired lifestyle(s), e.g., interests, opinions, culture, etc. For example, the user may be able to focus the search for an area including particular categories and/or subcategories of lifestyle preferences that are more pertinent to a preferred lifestyle.

The ranked areas of the map may be displayed on a user interface (e.g., interactive display screen) of a computing device, such as a computer, laptop, tablet, mobile phone, and wearable electronic device. Any of the ranked areas may include an indicator associated therewith and displayed on the interactive display screen with the geographic map to denote a level of presence within a particular area of one or more lifestyle preferences that were considered of interest to the user. The indicator may include an overlay (e.g., color, shade, pattern) or icon for indicating the ranking level (e.g., match quality) of the respective area as compared to the prioritized lifestyle preferences selected by the user. The results of the match operating mode may be saved for later use and/or the user may send the results of the match operating mode to a family member or realtor to facilitate the user's relocation to another area.

The rate operating mode enables the user to rate an area, e.g., geographic region/segment, with respect to one or more lifestyle preferences included within that area. The rating is preferably based on the user's experience with and/or perception of lifestyle preferences of the area. The rate operating mode may include an interactive map displayed on the screen of the computing device, wherein the user may select an area for rating one or more lifestyle preferences included within the selected area. Categories of lifestyle preferences may include, and are not limited to, locales, schools, dependent care, food and drink, health and wellness, transportation information, shopping, entertainment, recreation, pet care, etc. Each lifestyle preference may further be defined into subcategories, for example, school subcategories may include pre-school, middle school, high school, public/private school, etc. Data including ratings of other areas, which may be submitted by other users, may be accumulated and compiled into a resource, e.g., database, for utilization with the match operating mode for analysis with the selected and prioritized lifestyle preferences of a particular user.

In one embodiment, a computer-implemented method provides a graphic display of location-based information, i.e., geographic locations including lifestyle preferences better suited to a particular user. The method provides at least one selectable item on the interactive display screen of the computing device. Each selectable item corresponds to an operating mode, a lifestyle preference (category, subcategory thereof), and/or a prioritization scale of the lifestyle preference. The method further displays a map of a geographic region on the screen of the computing device in response to location information, wherein the map includes a plurality of areas (regions, segments, etc.) and each area includes classified data of the lifestyle preference. The method further receives, at the computing device, a selection by the user of the selectable item corresponding to the match operating mode and displays, on the screen of the computing device, the selectable item corresponding to the lifestyle preference based on the selection of the match operating mode by the user. The method further receives, at the computing device via the prioritization scale of the lifestyle preference displayed on the screen, a prioritization value of the lifestyle preference by the user, and analyzes, at the computing device, the prioritization value of the lifestyle preference provided by the user with the classified data of the lifestyle preference for areas proximate the geographic region. The method further ranks, at the computing device, map areas displayed on the screen based on the analysis of the prioritization value of the lifestyle preference with the classified data of the lifestyle. The method further indicates, on the interactive display screen of the computing device, the ranking of map areas displayed on the interactive display screen based on the analysis of the prioritization value of the lifestyle preference with the classified data of the lifestyle preference.

In another embodiment, a computing device capable of being coupled to a communication network displays an interactive geographic map including indicated areas compatible with prioritized lifestyle preferences of a user. The computing device provides location-based information of one or more lifestyle preferences and comprises one or more processors, a user interface including an interactive display screen, and a non-transitory computer-readable memory coupled to the one or more processors, the communication network, and the user interface. The non-transitory computer-readable memory includes instructions stored thereon on that, when executed by the one or more processors, causes the computing device to provide, on the interactive display screen of the computing device, at least one selectable item, each selectable item corresponding to an operating mode, a lifestyle preference, a category of the lifestyle preference, and/or a prioritization level of a prioritization scale of the category of the lifestyle preference; display, on the interactive display screen of the computing device, a map of a geographic region in response to geographic location information, the map including at least one area associated with classified data of the lifestyle preference; receive, on the interactive display screen of the computing device, selection of a match operating mode by the user; display, on the interactive display screen of the computing device, the selectable item corresponding to the category of the lifestyle preference based on the selection of the match operating mode by the user and the at least one area of the map; receive, on the interactive display screen of the computing device, a selection of the category of the lifestyle preference by the user; display, on the interactive display screen of the computing device in response to the received selection of the category of the lifestyle preference, the prioritization scale associated with the received selection of the category of the lifestyle preference; receive, on the interactive display screen of the computing device via the prioritization scale, the prioritization value of the category of the lifestyle preference selected by the user; analyze, at the computing device, the prioritization value of the category of the lifestyle preference selected by the user with the classified data of the selected category of the lifestyle preference associated with the at least one area; rank, at the computing device, the at least one area of the map displayed on the screen based on the analysis of the prioritization value of the category of the lifestyle preference selected by the user with the classified data of the category of the lifestyle preference associated with the at least one area; and indicate, on the interactive display screen of the computing device, the ranking of the least one area of the map displayed on the screen based on the analysis of the prioritization value of the category of the lifestyle preference selected by the user with the classified data of the category of the lifestyle preference.

In another embodiment, a computer-readable storage media stores computer executable instructions for identifying locations with lifestyle preferences selected by a user, wherein the instructions, when executed by one or more processors, cause the one or more processors to: provide at least one selectable item on an interactive display screen of a computing device, each selectable item corresponding to an operating mode, a lifestyle preference, a category of the lifestyle preference, and/or a prioritization level of a prioritization scale of the category of the lifestyle preference; display a map of a geographic region in response to geographic location information, the map including at least one area associated with classified data of the lifestyle preference; receive selection of a match operating mode by the user; display the selectable item corresponding to the category of the lifestyle preference based on the selection of the match operating mode by the user and the at least one area of the map; receive a selection of the category of the lifestyle preference by the user; display the prioritization scale associated with the received selection of the category of the lifestyle in response to the received selection of the category of the lifestyle preference; receive the prioritization value of the category of the lifestyle preference selected by the user; analyze the prioritization value of the category of the lifestyle preference selected by the user with the classified data of the selected category of the lifestyle preference associated with the at least one area; rank the at least one area of the map displayed on the screen based on the analysis of the prioritization value of the category of the lifestyle preference with the classified data of the category of the lifestyle preference associated with the at least one area; and indicate the ranking of the least one area of the map displayed on the interactive display screen based on the analysis of the prioritization value of the category of the lifestyle preference with the classified data of the category of the lifestyle preference.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof.

DETAILED DESCRIPTION

Implementing the techniques described below, a computing device presents information on a user interface, e.g., interactive display screen, to provide a user with geographic locations that have one or more desired lifestyles. In general, the computing device utilizes prioritized lifestyle preferences provided by the user to search and identify suitable geographic areas that are compatible with the prioritized lifestyle preferences. Additionally, the computing device provides the user with the ability to rate an area's lifestyle preferences based on the user's experience and/or perception of the lifestyle preferences of the area. These and other techniques are described in more detail below in reference to FIGS. 1-13.

Figure 1:
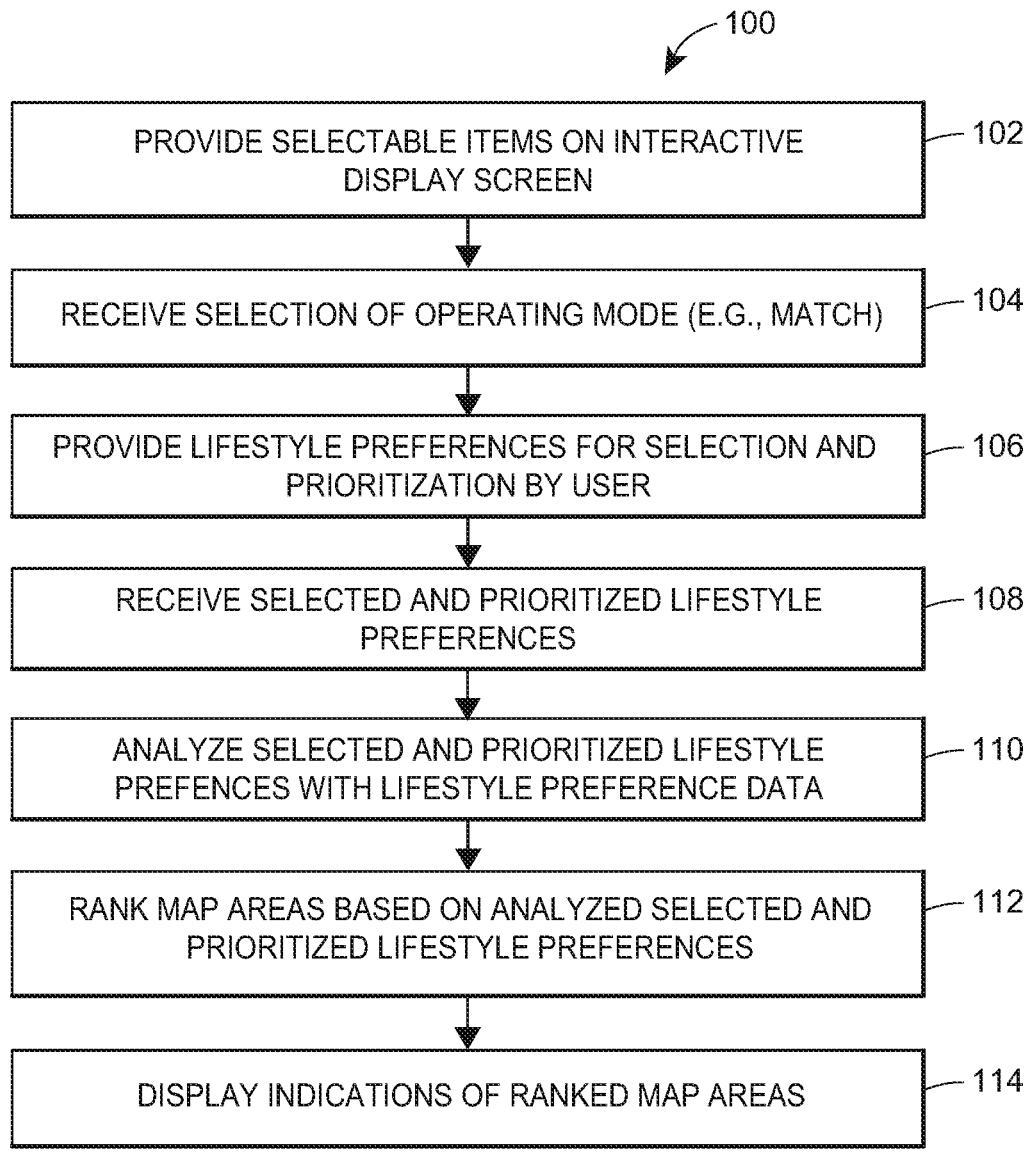
FIG. 1 illustrates a flow diagram of an exemplary method for providing a map or list of ranked areas in accordance with the presently described embodiments.

Referring now to FIG. 1, one implementation of an example method 100 for providing graphic information to a user via a computing device, e.g., client device, having an operating system and an interactive display screen includes providing at least one selectable item on the screen (block 102). The selectable items may include and correspond to an operating mode, a lifestyle preference (category, subcategory thereof), and a prioritization scale and value of the lifestyle preference. The method 100 further includes displaying a map of a geographic area in response to location identification. The location identification, which may be provided by the user through the interactive display screen, may include a city name or postal code. Additionally, the location identification may be acquired automatically by the computing device implementing an integrated location positioning module, e.g., global positioning system (GPS).

The method 100 further includes receiving selection of an operating mode (block 104), such as a match operating mode or a rate operating mode. The match operating mode provides lifestyle preferences to the user via the interactive display screen for selection and prioritization (block 106). Lifestyle preferences generally relate to interests, opinions, behaviors, and cultures and may reflect an individual user's attitude, way of life, values, and or world view. Categories of lifestyle preferences include, and are not limited to, locales, schools, dependent care, food and drink, health and wellness, transportation information, shopping, entertainment, recreation, hobbies, and pet care. Each lifestyle preference may further be defined into subcategories, for example, school subcategories may include pre-school, middle school, high school, public/private school, etc. The lifestyle preferences may presented to the user through the interactive display screen of the computing device in the form of a survey, wherein the user may select a particular lifestyle preference for consideration during a search for a geographic area that includes and/or relates to the particular lifestyle preference. The user may select and prioritize one or more lifestyle preferences of interest (block 108). During the selection and prioritization of lifestyle preferences, the user may be provided with a prioritization scale for prioritizing the particular lifestyle preference. For example, the prioritization scale may be displayed on the interactive display screen and include a range of values from least important to most important, e.g., least important, somewhat important, most important. In addition, the prioritization scale may include the ability for the user to further designate the selected lifestyle preference as required, e.g., "must have."

Upon completion of the selection and prioritization of the lifestyle preference(s), the computing device analyzes the selected and prioritized values of the lifestyle preference(s) provided by the user (block 110). For example, one or more processors of the computing device may compare the selected and priorities values of lifestyle preferences provided by the user with classified lifestyle preference data associated with geographic areas proximate the location information. The one or more processors of the computing device may rank areas on the map based on the analysis of the user's selected and prioritized lifestyle preferences and the rated lifestyle preferences available in one or more areas on the map (block 112) proximate to the location identified or provided by the user or computing device. The areas may include, and are not limited to, municipalities, counties, parishes, cities, towns, districts, boroughs, and neighborhoods. The method 100 further includes indicating the ranking of each area on the interactive screen (block 114). The ranking indicators or indications may include displaying a descriptive and/or conspicuous border representative of the ranking proximate a perimeter of the area displayed on the map. The border indicator may include a color, shade, and/or pattern. Additional ranking indicators may include displaying a surface representative of the ranking over a surface of the area on the map. The surface indicator may include a color, shade, and/or pattern.

Figure 2:
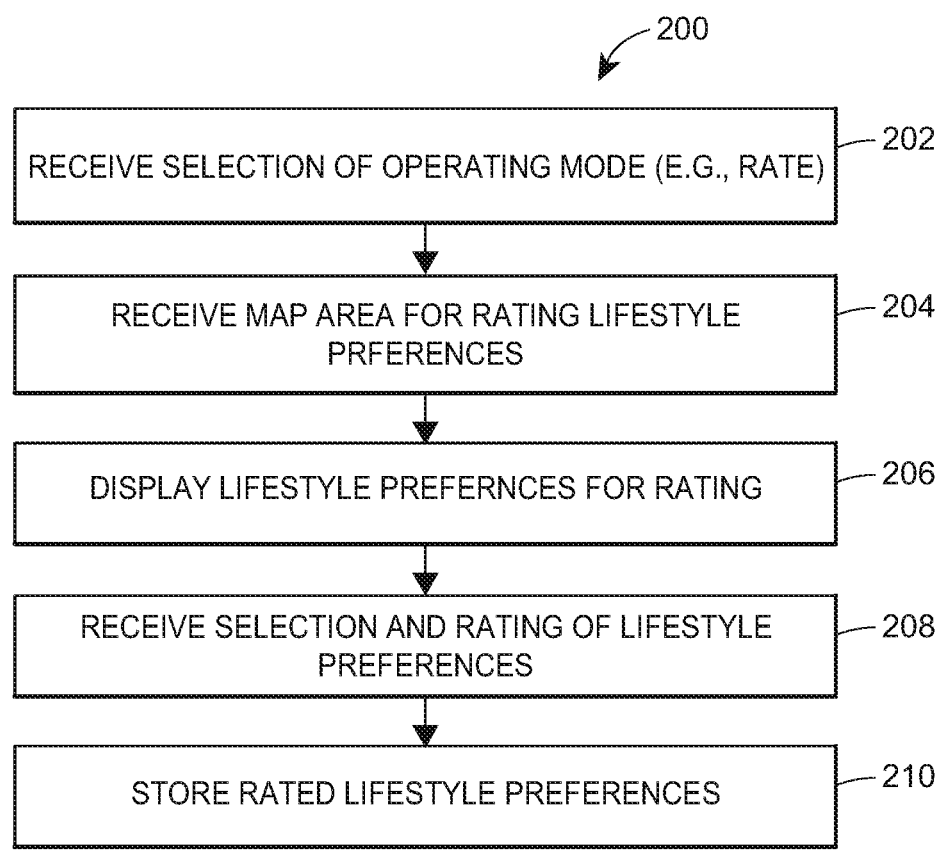
FIG. 2 illustrates a flow diagram of an exemplary method for rating areas with respect to lifestyle preferences in accordance with the presently described embodiments.

Another example method 200 related to providing graphic information to a user on a computing device is shown in FIG. 2. The example method 200, which may be separate from or integrated with the example method 100 described in FIG. 1, includes receiving a selection of a rate operating mode (block 202). The rate operating mode provides the user with the ability to rate one or more lifestyle preferences associated with a particular geographic location, e.g., area, (block 204). Categories of lifestyle preferences associated with the particular area may include locales, schools, dependent care, food and drink, health and wellness, transportation information, shopping, entertainment, recreation, hobbies, pet care, etc. Each lifestyle preference may further be defined into subcategories, for example, school subcategories may include pre-school, middle school, high school, public/private school, etc. The lifestyle preferences may be presented to the user in the form of a survey where the user may select a particular lifestyle preference for rating (block 206). The user selects and rates any lifestyle preference of interest (block 208). During the selection and rating of lifestyle preferences, the user may be provided with a rating scale (e.g., Likert-type scale) for rating the particular lifestyle preference. For example, the rating scale may include a range of rating values from poor to excellent, e.g., poor, average, excellent. Upon completion of the rating of one or more lifestyle preferences, the information may be stored on a memory database for later use, such as during the analysis of the match operating mode (block 210).

Figure 3:
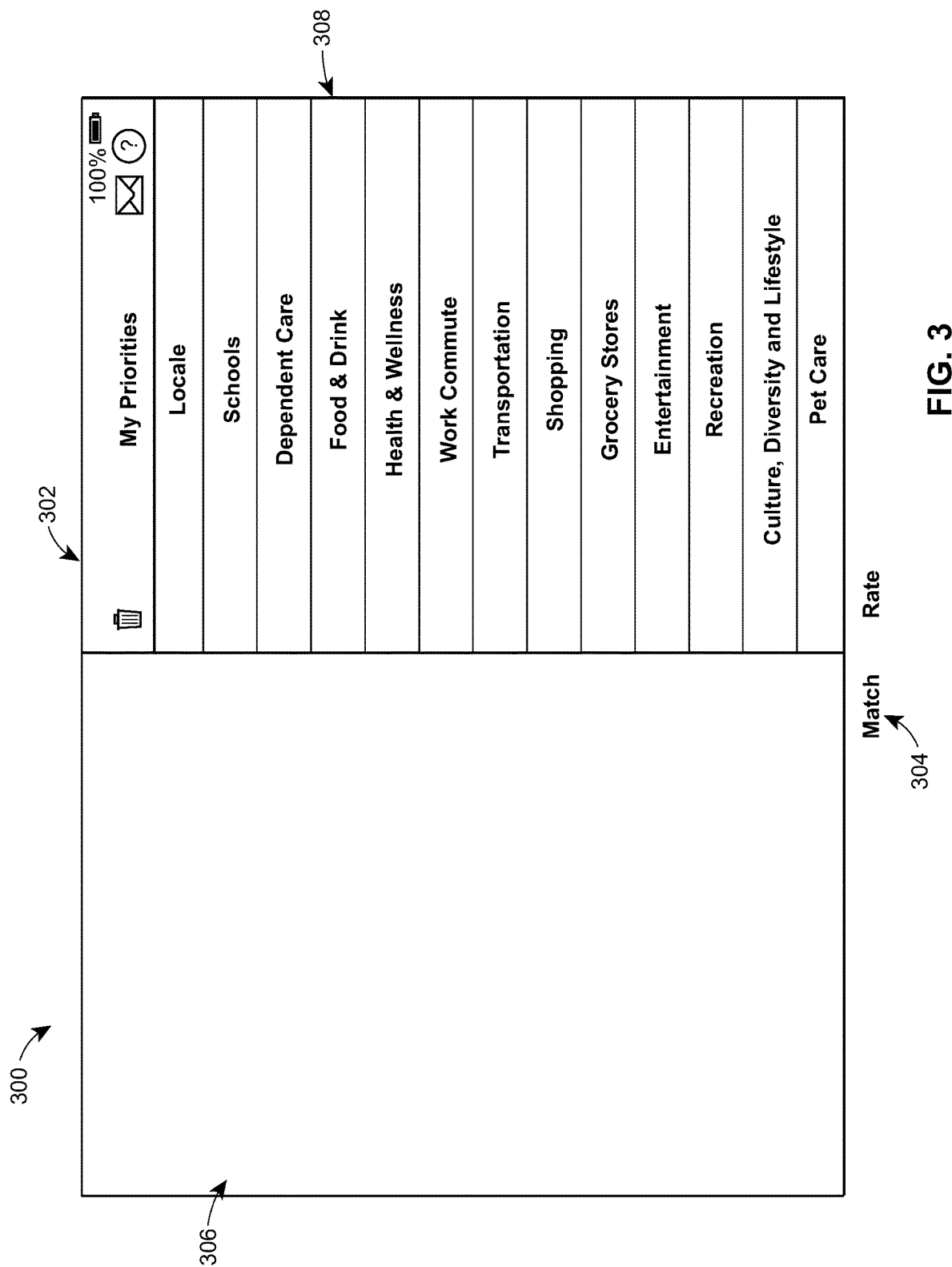
FIG. 3 illustrates an exemplary display of a portion of the match operating mode in accordance with the presently described embodiments.
Figure 4:
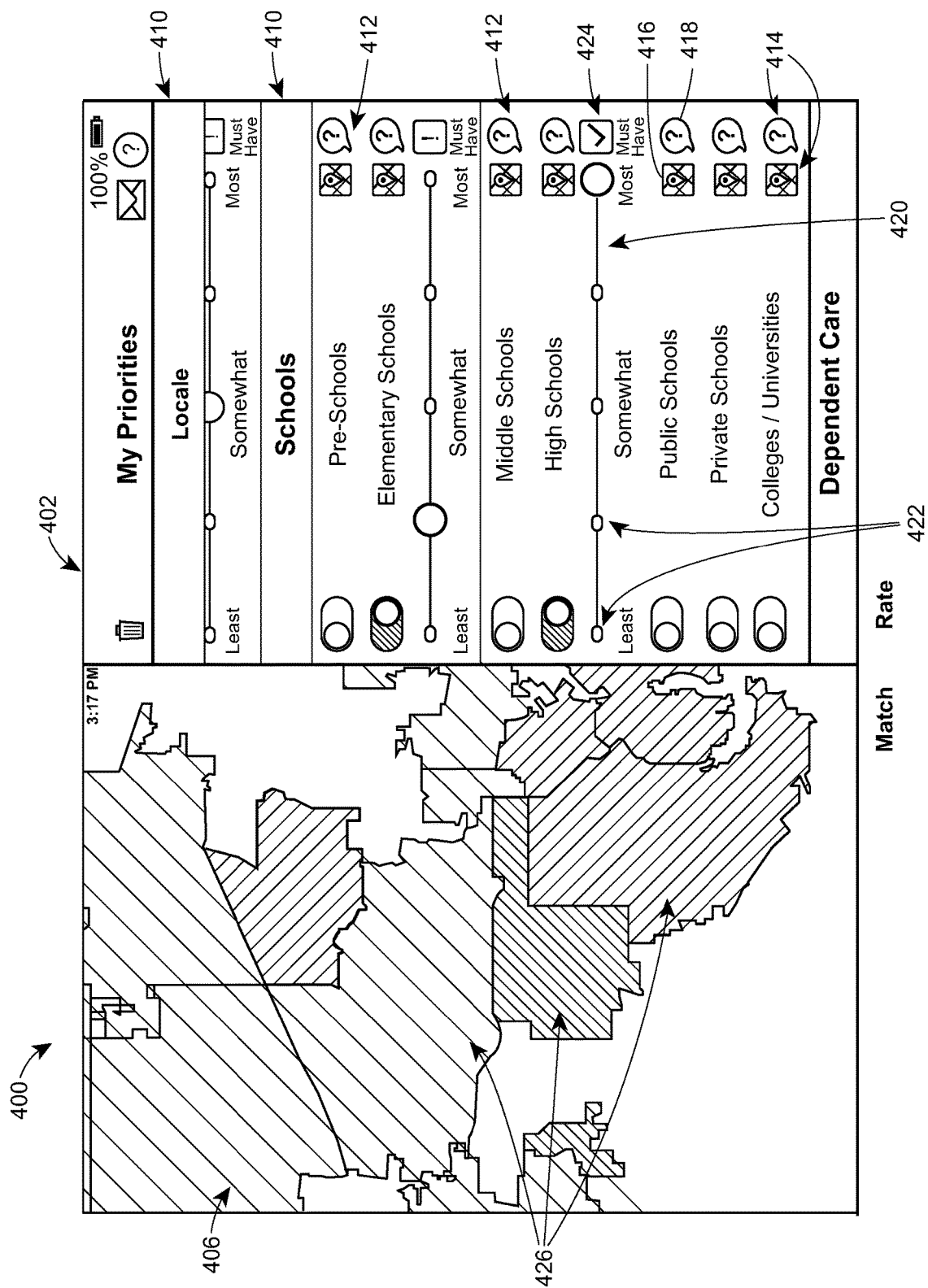
FIG. 4 illustrates an exemplary display of another portion of the match operating mode in accordance with the presently described embodiments.
Figure 5:
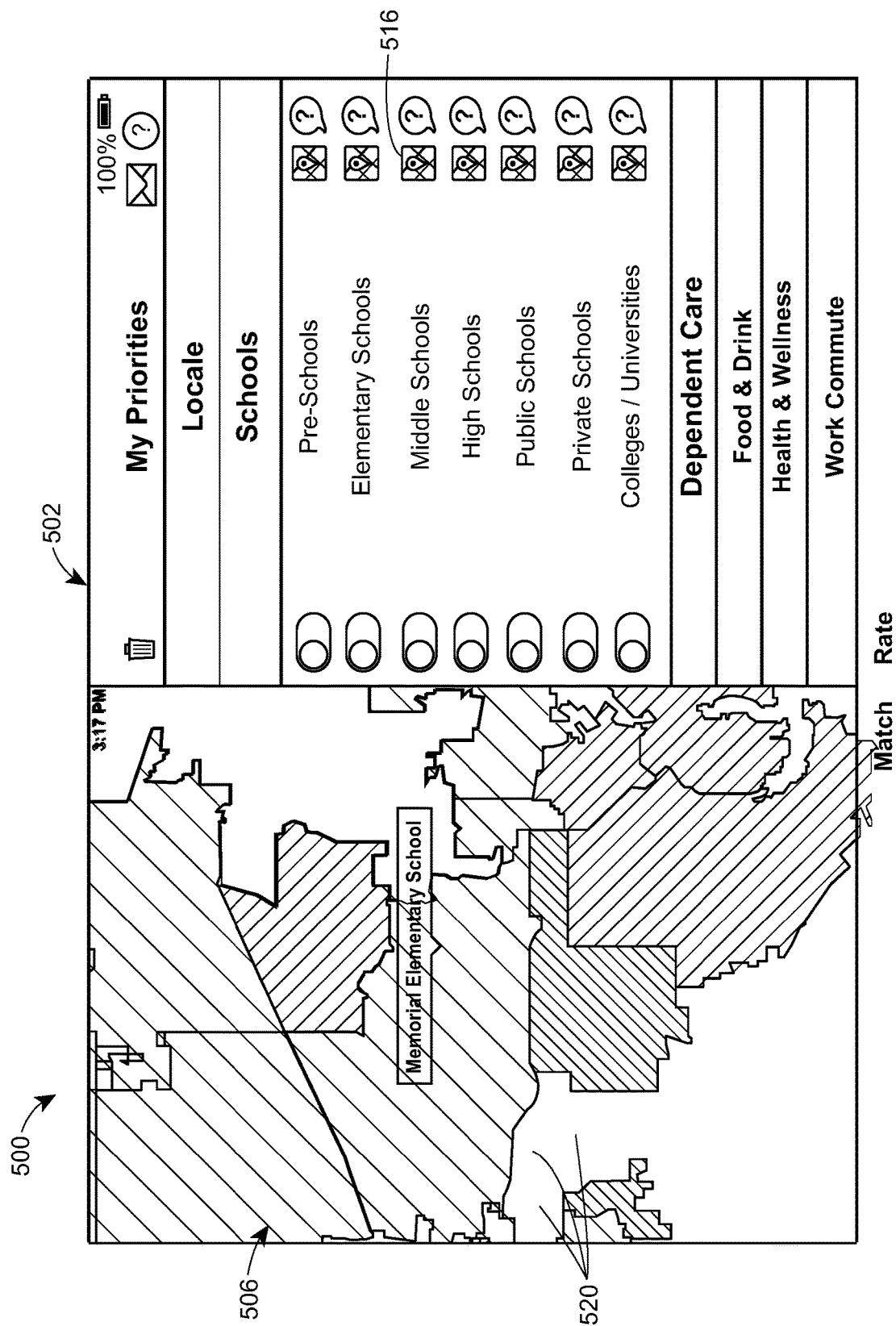
FIG. 5 illustrates an exemplary display of another portion of the match operating mode in accordance with the presently described embodiments.

Referring now to FIG. 3, an example illustration of graphic information presented on the interactive display screen 302 of the computing device 300 is shown in response to the user selecting the match operating mode (icon) 304 in association with a particular location. A map 306 displayed on the screen 302 may be based on the location of the computing device 300 at the time the match operating mode was selected by the user, e.g., via a GPS module, or may be in response to entry of the desired location provided by the user, e.g., city name, postal code. An expandable list of lifestyle preferences 308 may displayed on the interactive display screen 302 for selection and prioritization by the user. The map 306 and the listing of lifestyle preferences 308 may be simultaneously displayed on the interactive display screen 302 of the computing device 300 as shown in FIG. 3 in any particular format. Alternatively, the map 306 and the list of lifestyle preferences 308 may be separately displayed on the interactive display screen 302 of the computing device 300, wherein the user may navigate between one display including a view of the map 306 and another display including a view of an expandable list of lifestyle preferences 308 that may ultimately include prioritization options.

The listing of lifestyle preferences 308 may include categories 410 and subcategories 412. See FIG. 4. Categories of lifestyle preferences include, for example, locales, schools, dependent care, food and drink, health and wellness, transportation information, shopping, entertainment, recreation, hobbies, pet care, etc. Each lifestyle preference may further be expanded and defined into subcategories, for example, school subcategories may include pre-school, elementary school, high school, public school, private school, colleges/universities.

General and/or specific information related to a particular category 410 and/or subcategory 412 of lifestyle preference may be provided by the computing device 400 and presented on the interactive display screen 402 in response to selection by the user of a particular icon or symbol 414, e.g., locator 416, question mark 418; associated with more information. General information may include a description of the category and/or subcategory of the lifestyle preference(s), and specific information may include a location or description of a particular item listed within the category and/or subcategory of the lifestyle preference(s). For example, general information pertaining to the middle school subcategory of schools may include a description that middle schools include students in grades 6-8, and/or ages 10-13. An example of specific information pertaining to the middle school subcategory of schools may include a listing of middle schools within the displayed map area 426, or the contact information associated with middle schools located within the geographic area 426 displayed with the map 406. Further specific information may include displaying the location of a category item and/or subcategory item of the lifestyle preference in response to "selection" of the map locator icon 416 shown in FIG. 4. For example, referring to FIG. 5, selecting the locator icon 516 associated with Elementary Schools may result in one or more icons 520 being displayed in one or more areas of the map 506. Further selecting an elementary school icon 520 on the map 506 may provide additional information pertaining to the selected icon, e.g., school name, address. It is to be understood that "selection" of a map icon or symbol and the like, e.g., radio button, includes clicking and/or tapping (e.g., single or double click/tap) on the icon or symbol, as well has hovering or setting a cursor or screen selection instrument (e.g., stylus, finger) atop the interactive icon or symbol.

Referring again to FIG. 4, upon selection of the category 410 and/or subcategory 412 of a lifestyle preference, etc., a prioritization scale 420 may be displayed on the screen 402 of the computing device 400. The user may select a prioritization level 422 related to the user's level of interest in the selected category 410 and/or subcategory 412 of lifestyle preference. For example, the user may select a prioritization level 420 ranging from least important, somewhat important, and most important. In addition, the user may indicate that a selected category 410 and/or subcategory 412 of lifestyle preference be required in the search results for any area 426 receiving a ranking.

A category 410 and/or subcategory 412 of a particular lifestyle preference may be designated as "must have" 424 by the user. The "must have" designation requires an area 426 listed in the ranked search results of the match operating mode to include a sufficient rating for the "must have" category 410 and/or subcategory 412 of lifestyle preference designated by the user. That is, for an area 426 to be included in the ranked results of the match operating mode, the area 426 must include a nominal rating for any category 410 and/or subcategory 412 of lifestyle preference labeled as "must have." In other words, for an area 426 to receive a ranking, it must possess a rating at or above a particular rating level for any category 410 or subcategory 412 of lifestyle preference designated as "must have." For example, for a particular rating level of 3 or higher for a designated as mandatory, e.g., "must have," category 410 or subcategory 412 of lifestyle preference, the rating of the "must have" category 410 or subcategory 412 of lifestyle preference of the area 426 must be 3 or higher, e.g., 3 or more stars on a scale of 1 to 5, for the area 426 to be included in the ranked results of the match operating mode. If the category 410 or subcategory of lifestyle preference within the area 426 of the map 406 does not include a rating above 3 in this example, that area 426 of the map 406 will not be ranked and/or listed in the results of the match operating mode, regardless of the rating and/or overall match quality percentage of the other categories 410 or subcategories 412 of lifestyle preferences within the area 426.

Figure 6:
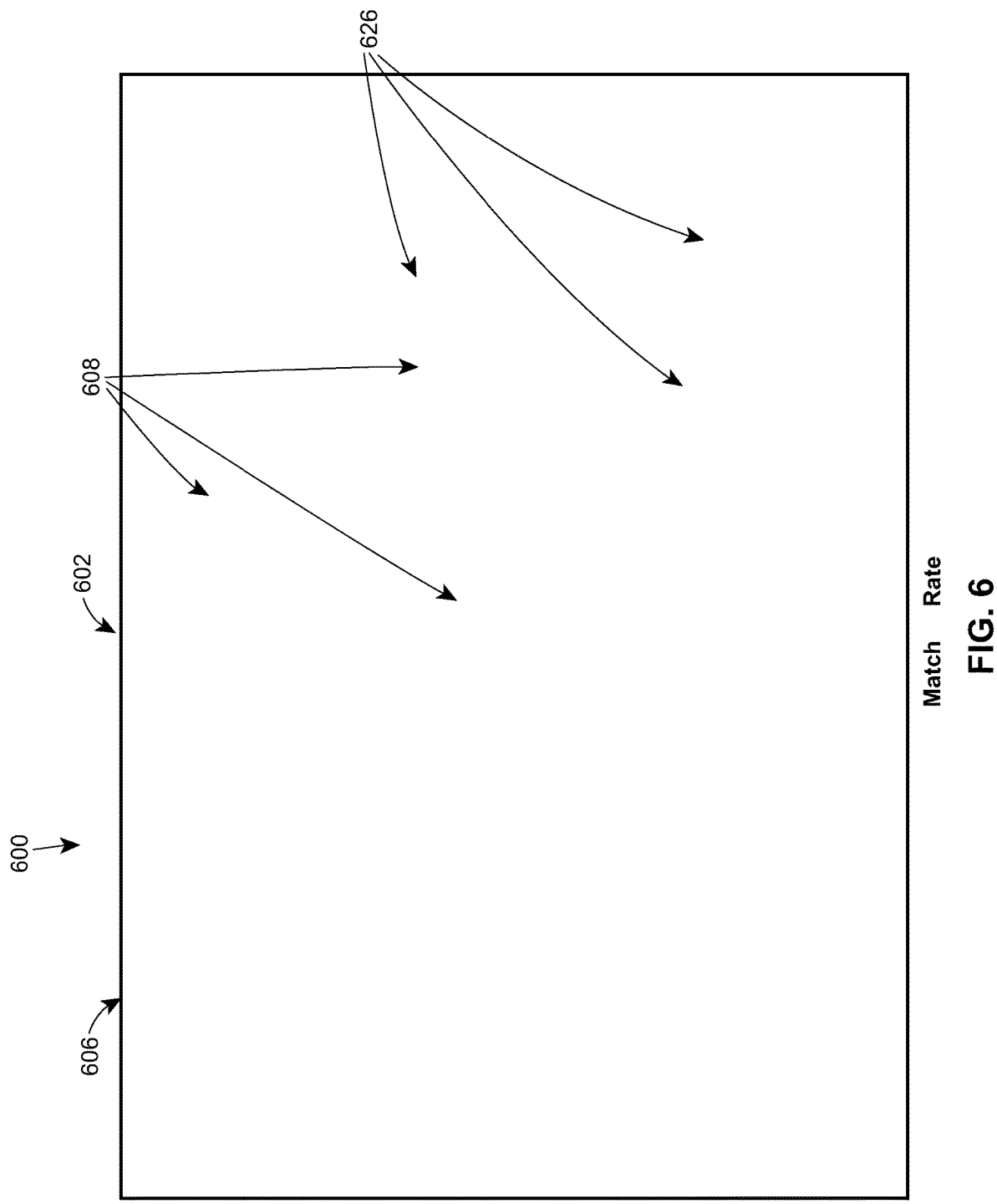
FIG. 6 illustrates an exemplary display of another portion of the match operating mode in accordance with the presently described embodiments.

FIG. 6 depicts one example of the ranked results of the match operating mode presented on the interactive display screen 602 of the computing device 600, wherein areas including various compatibilities to the selections and prioritizations of lifestyle preferences provided by the user are displayed on the map 606 with the appropriate ranking indicator, e.g., color, shading, and/or pattern. Match quality indicates the amount or level of compatible lifestyle preferences included within the area 608, e.g., city that match the selections and prioritizations of lifestyle preferences provided by the user. For example, a city with a match quality of 50% indicates that approximately half of the user's selected and prioritized lifestyle preferences are present in that particular city. Calculating the match quality may include determining the number of related entities located within and/or near the city selected by the user as well as an analysis of the prioritization of the lifestyle preferences provided by the user and/or the ratings of the lifestyle preferences within the city. The ratings of the lifestyle preferences may be attained (from storage and/or on a real-time basis) automatically, upon request, periodically, etc., by various methods, such as, for example, surveys, polls, critic ratings, feedback, crowdsourcing, and the like.

The match compatibility may be segmented into difference ranges of percentages, wherein each range may be distinguished by the indicator, such as color, shading, and/or pattern. For example, a match quality range of 80-100% may be indicated by the darkest shade 626 in the graphical display of results of the match operating mode shown in FIG. 6. Additionally, a match quality percentage below 20% may be identified by the lightest shade in the graphical display of results of the match operating mode shown in FIG. 6. Other types of indicators may include a colored, shaded, and/or patterned border about an area. If the user selected any lifestyle preference category as mandatory, e.g., "must have," and an area of the map did not include a rating at or above a predetermined rating level, any area of the map that did not include a rating at or above the predetermined level would not include an indicator of compatibility or may be omitted, e.g., blanked out, from being displayed on the map 606.

Figure 7:
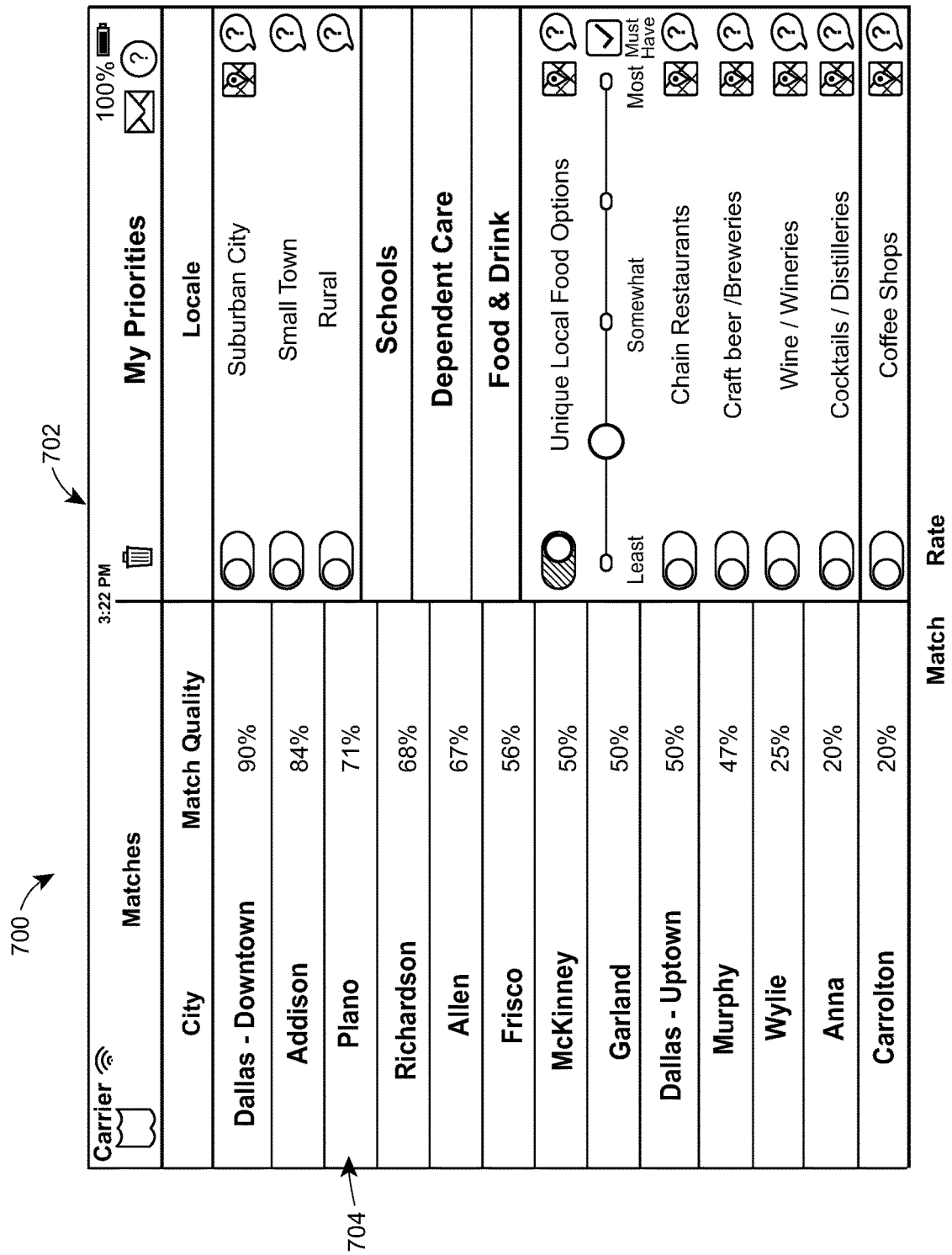
FIG. 7 illustrates an exemplary display of another portion of the match operating mode in accordance with the presently described embodiments.

FIG. 7 depicts an example of an alternate display of the match operating mode results, wherein areas including various match compatibilities to the selections and prioritizations of categories and subcategories of lifestyle preferences provided by the user are displayed in a list 704 on the interactive display screen 702 of the computing device 700. The list 704 of areas, e.g., cities, may include a corresponding level of match quality, e.g., percentage.

Figure 8:
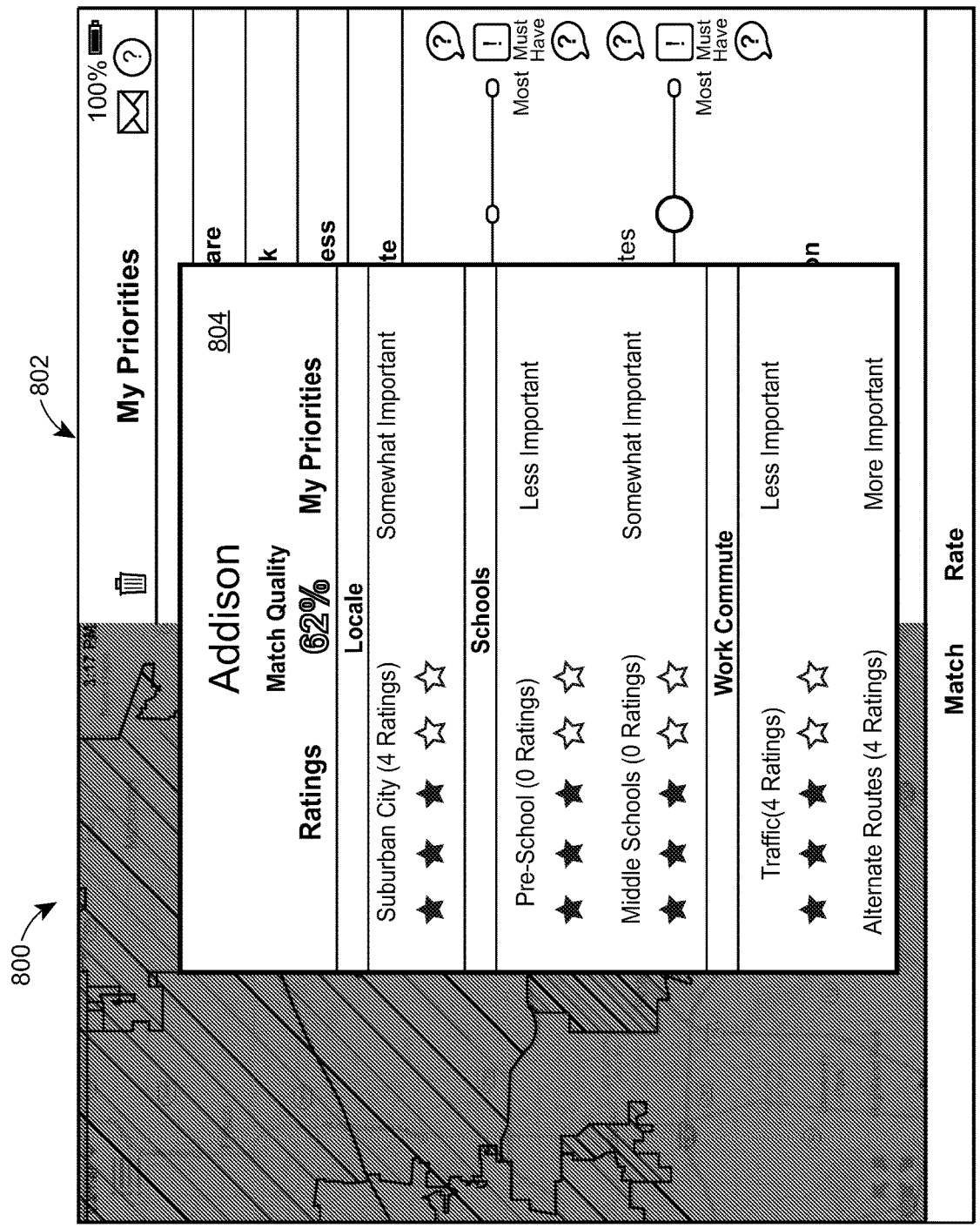
FIG. 8 illustrates an exemplary display of another portion of the match operating mode in accordance with the presently described embodiments.
Figure 9:
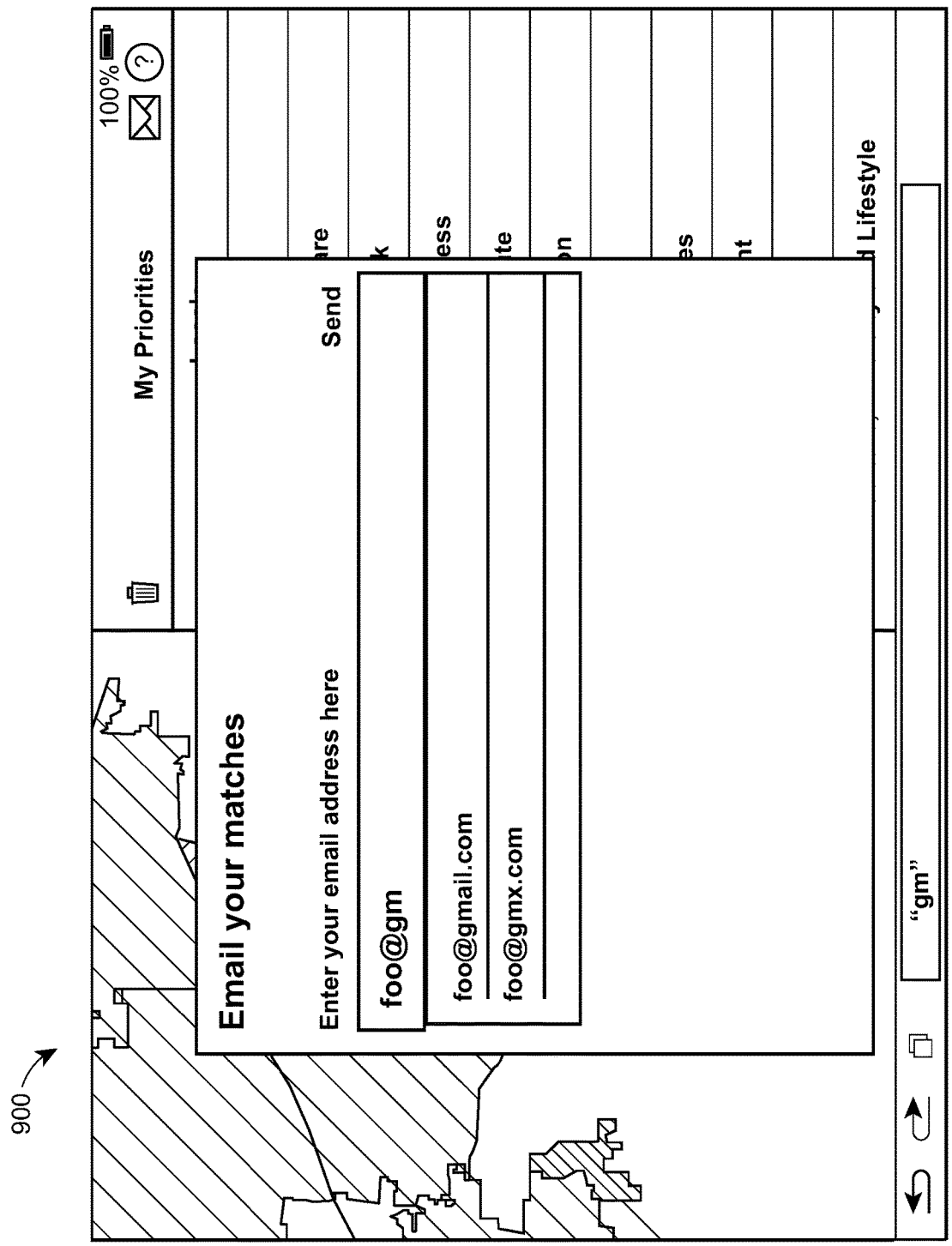
FIG. 9 illustrates an exemplary display of another portion of the match operating mode in accordance with the presently described embodiments.

Additional information related to the ranking of the area of the map may be provided to the user. For example, in response to selection of an area 608 of the graphical map 606 illustrated in FIG. 6, or selection of city in the list 704 of areas illustrated in FIG. 7, the computing device may display particular results of the analysis of the selected and prioritized categories and/or subcategories of lifestyle preferences provided by the user. For example, in response to the user's selection of the city "Addison" in FIG. 6 or 7, the computing device may display the comparison match quality of the ratings for the categories and subcategories of lifestyle preferences available within Addison to the user's selection and prioritization of categories and subcategories of lifestyle preferences. FIG. 8 is an example illustration of pop-up information shown on the interactive screen 802 of the computing device 800 in response to user selection of "Addison," wherein additional information related to the composition of the final ranking for Addison is provided, such as a 3 star rating for several categories (i.e., Locale, Schools, Work Commute) and subcategories (i.e., Suburban City, Pre-Schools, Middle Schools, Traffic, Alternate Routes) of user-selected lifestyle preferences and prioritizations.

After matching the lifestyle preferences, the user may save the match operating mode results to a memory device. In addition, the match operating mode results may be transmitted to another interested individual, such as a spouse, realtor, etc. See FIG. 9.

Figure 10:
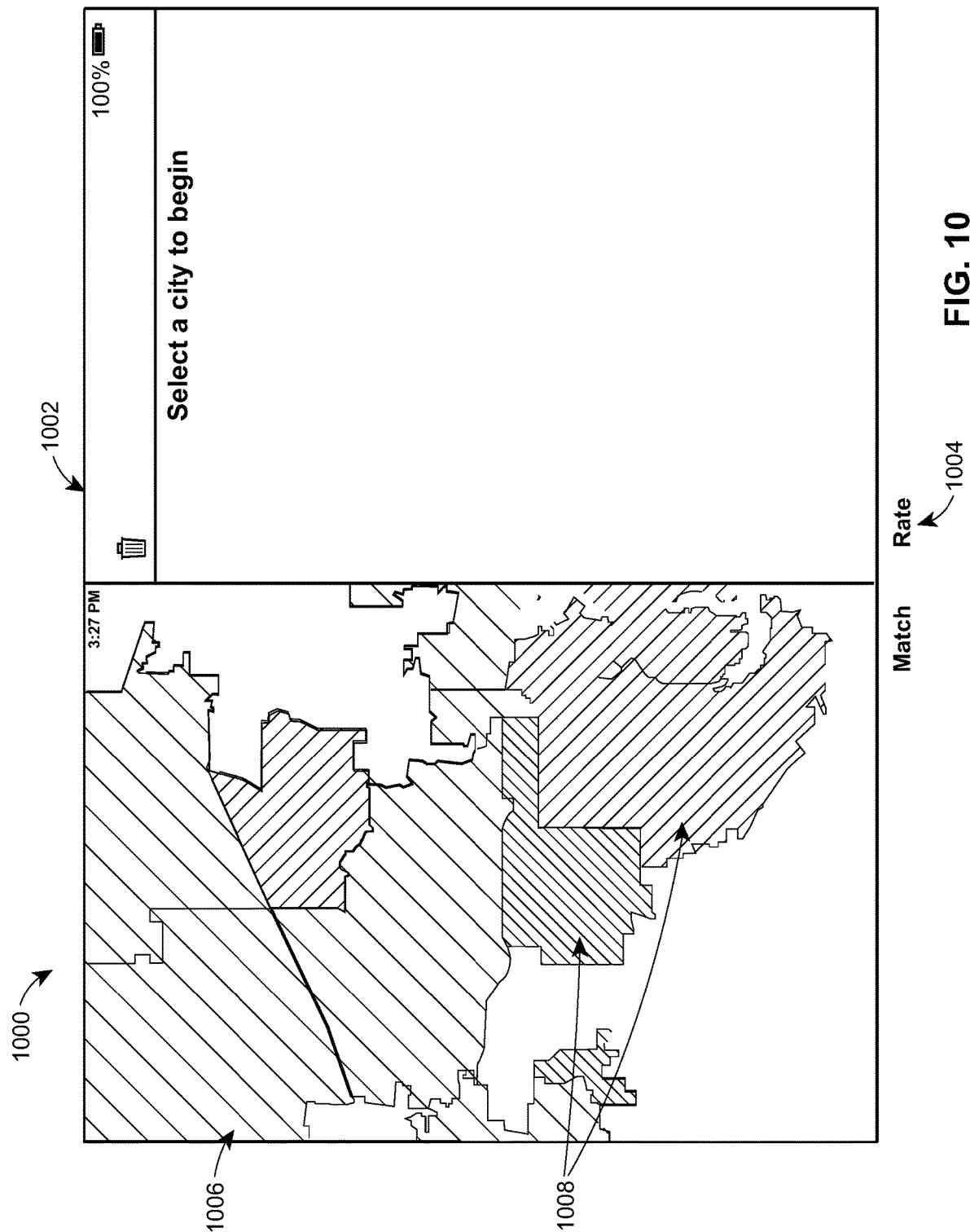
FIG. 10 illustrates an exemplary display of a portion of the rate operating mode in accordance with the presently described embodiments.

Referring now to FIG. 10, a screenshot of an example view illustrated on the interactive display screen 1002 of the computing device 1000 near the onset of the rate operating mode is depicted, wherein the user may rate lifestyle preferences associated with a particular area. The rate operating mode may be initiated by selecting the "Rate" icon 1004 on the interactive display screen 1002. The user may enter an address of interest and/or touch a particular map location 1008 on the interactive display screen 1002. Additionally, the computing device 1000 may utilize a positioning module (global positioning system) to initially provide the map 1006 on the interactive display screen 1002 that encompasses the location where the computing device 1000 is located. The displayed map 1006 includes areas 1008, which may depend on the viewing elevation of the displayed map. The user may select an area for rating lifestyle preferences of the selected area.

Figure 11:
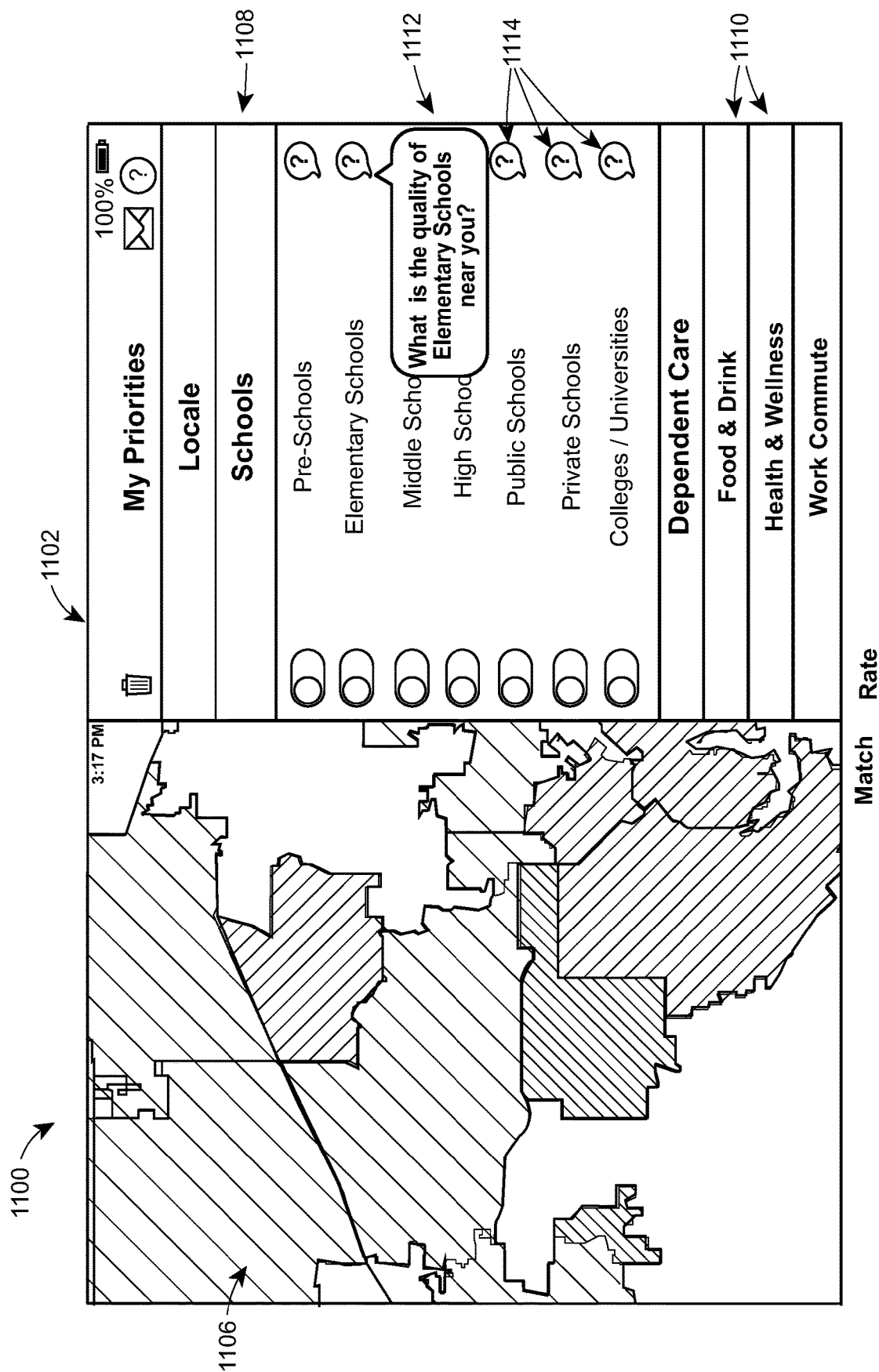
FIG. 11 illustrates another exemplary display of another portion of the rate operating mode in accordance with the presently described embodiments.

Upon selection of the area, a hierarchical list of lifestyle preferences associated with the selected area or segment may be displayed on the interactive display screen of the computing device. For example, FIG. 11 includes an example list 1108 of lifestyle preferences for rating by the user. The list of lifestyle preferences may be simultaneously displayed on the interactive display screen 1102 with the map 1106 as shown in FIG. 11, or the list 1108 of lifestyle preferences may be solely displayed on the interactive display screen 1102. The user is able to select categories 1110 and subcategories 1112 of lifestyle preferences for rating. The list 1108 of lifestyle preferences may also include additional selectable items 1114, e.g., icon, symbol, radio button; wherein additional information about the lifestyle preference, category, subcategory, etc. may be provided in response to selection of the selectable item 1114. For example, general and/or specific information related to a lifestyle preference (category 1110 and/or subcategory 1112 thereof) may be provided in a text bubble in response to selection of a selectable item, e.g., icon 1114. Additionally, the geographic location of lifestyle preferences within a category and/or subcategory may be displayed on the map 1106 in response to selection of an additional selectable icon or symbol, e.g., locator icon, (not shown).

Figure 12:
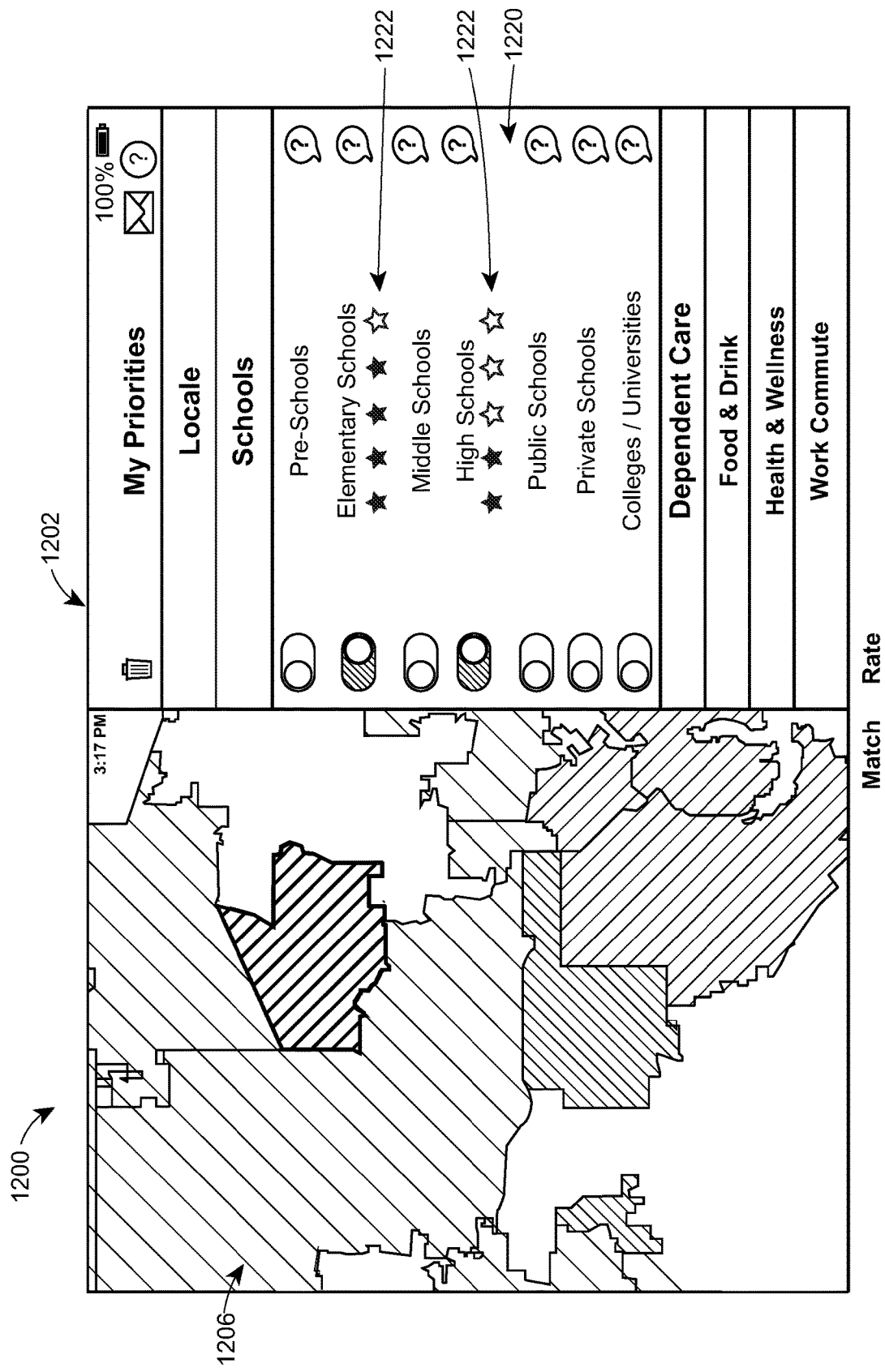
FIG. 12 illustrates a further exemplary display of another portion of the rate operating mode in accordance with the presently described embodiments; and, FIG. 13 illustrates a block diagram of an exemplary computing device coupled to a communication network on which an exemplary system may operate in accordance with the presently described embodiments.

Upon selection of a lifestyle preference category 1110, a lifestyle preference subcategory 1112 may be displayed, if available. For example, FIG. 11 shows a subcategory 1114 of schools (e.g., Pre-Schools, Elementary Schools, Middle Schools, High Schools, Public Schools, Private Schools, and Colleges/Universities) in response to the lifestyle preference category 1110 of Schools being selected by the user. Upon selection of a particular subcategory of lifestyle preference, a rating area may appear to enable the user to rate the subcategory of lifestyle preference. Rating a lifestyle preference may include selecting predetermined text, positioning a graphical scale, and/or or entering a grade, e.g., letter, number, symbol. Some examples of predetermined text include: Excellent, Strongly Agree, Very Good, Agree, Average, Disagree, Below Average, Strongly Disagree, Poor, etc., and some examples of predetermined symbols include Stars, Smiley Faces, Thumbs-Up, Thumbs-down, etc. For example, FIG. 12 depicts the rating area 1220 including a range of rating values 1222, e.g., stars, that is displayed in response to user selection of subcategory lifestyle preferences Elementary Schools and High Schools. Although the rating area 1220 for these subcategory lifestyle preferences appears below the subcategory lifestyle preference in this example, it is to be understood that the rating area may be displayed anywhere on the interactive display screen of the computing device, and/or may be displayed as a separate pop-up window or on another screen.

After rating the lifestyle preferences, the user may save the entered input, which will eventually be integrated into a database of lifestyle preference rating data. At any point during the rating process, the user may save entered input, wherein the saved entries may be submitted to the lifestyle preference database; and/or the user may return to the rating operating module to continue rating the lifestyle preferences from where the user last left the rating process.

Figure 13:
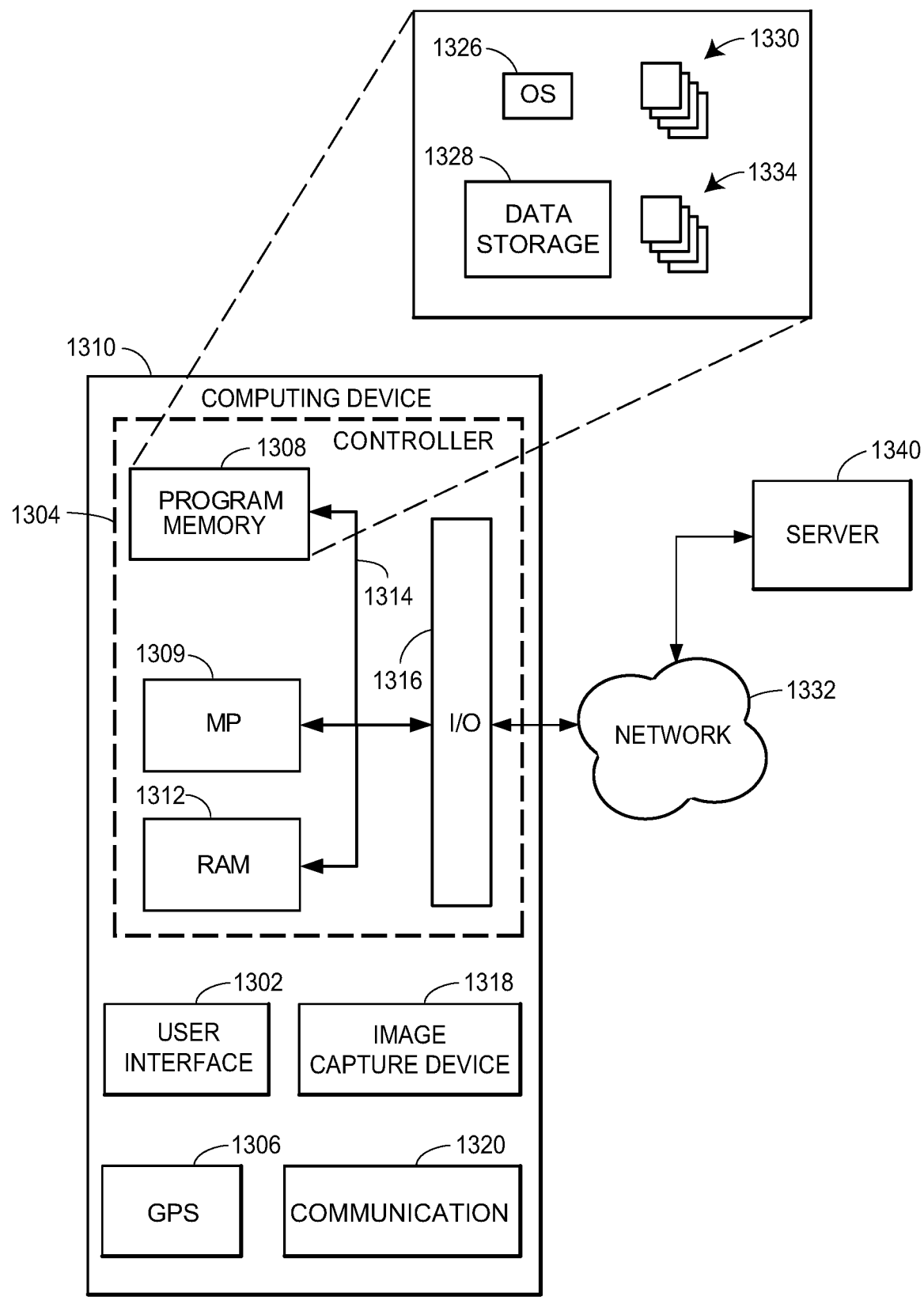

An example system capable of executing the methods described herein is illustrated in FIG. 13. The system includes a computing device 1310, which may include a user interface module 1302, a positioning module 1306 such as a global positioning system (GPS) module, a communication module 1320, and a controller 1304. The computing device 1310 may be integrated into a single device that can perform all the functions described herein and/or may be distributed among several communicably coupled computing devices. It will be appreciated that functions performed a single computing device 1310 may also be performed by several operatively coupled computing devices. The computing device 1310 may be a general-use personal computer, laptop, cellular phone, smartphone, tablet computer, or wearable computer (e.g., a watch, glasses, etc.). Further, the computing device 1310 may be a thin-client device that outsources some or most processing to a server device 1340.

The controller 1304 includes a program memory 1308, a microprocessor (MP) 1309, a random-access memory (RAM) 1312, and input/output (I/O) circuitry 1316; all of which are interconnected via an address/data bus 1314. Although the I/O circuitry 1316 is depicted in FIG. 13 as a single block, the I/O circuitry 1316 may include a number of different types of I/O circuits. The program memory 1308 includes an operating system 1326, a data storage device 1328, a plurality of software applications 1330, and a plurality of software routines 1334. The operating system 1326 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 1328 may include application data for the plurality of applications 1330, routine data for the plurality of routines 1334, and other data necessary to interact with the server 1340 through a communication network 1332. In particular, the data storage device 1328 may include rating data associated with a vast amount of areas. In some embodiments, the controller 1308 may also include, or otherwise be operatively coupled for communication with other data storage mechanisms (e.g., one or more hard disk drives, optical storage drives, solid state storage devices, etc.) that may reside within the computing device 1310 or operatively coupled to the network 1332 and/or server device 1340.

The GPS module 1306 may use "Assisted GPS" (A-GPS), satellite GPS, or any other suitable global positioning protocol or system that locates the computing device 1310 via the position of the computing device 1310. For example, A-GPS utilizes terrestrial cell phone towers or Wi-Fi hotspots (e.g., wireless router points) to more accurately and more quickly determine the location of the computing device 1310 while satellite GPS is generally more useful in more remote regions that lack cell towers or Wi-Fi hotspots.

The computing device 1310 may also include a forward and/or a rearward image capture module 1318 which may be built-in cameras within the computing device 1310 and/or may be peripheral cameras, such as webcams, cameras capable of being operatively coupled to the computing device 1310

The GPS module 1306 and the image capture module 1318 may be referred to collectively as the "sensors" of the computing device 1310. It will be appreciated that additional GPS modules and/or image capture modules may be operatively coupled to the computing device 1310.

The communication module 1320 may communicate with the server device 1340 via any suitable wired or wireless communication protocol via the network 1332, such as a wireless telephony network (e.g., GSM, CDMA, LTE, etc.), a Wi-Fi network (802.11 standards), a WiMAX network, a Bluetooth network, etc. The communication unit 1320 may also be capable of communicating using a near field communication standard (e.g., ISO/IEC 18092, standards provided by the NFC Forum, etc.).

The user interface 1302 may include a "soft" keyboard that is presented on the interactive display screen of the computing device 1310, a keyboard (including external) capable of communicating via a wired or a wireless connection (e.g., a Bluetooth keyboard), and a mouse, or any other suitable user-input device or component (e.g., track ball, track pad, etc.). The user interface module 1302 may also include a microphone (not shown) capable of receiving voice input from a vehicle operator as well as an interactive display screen.

Further in reference to the controller 1308, it should be appreciated that although FIG. 13 depicts only one microprocessor 1309, the controller 1304 may include multiple microprocessors. The memory of the controller 1304 may also include multiple RAMs and multiple program memories. The controller 1304 may implement the RAM and the program memories as semiconductor memories, magnetically readable memories, and/or optically readable memories, for example. The one or more processors may be adapted and configured to execute any of the plurality of software applications and/or any of the plurality of software routines residing in the program memory 1308 in addition to other software applications and routines. One of the plurality of applications may be a client application that may be implemented as a series of machine-readable instructions for performing the various functions associated with implementing the lifestyle preference locator system, as well as receiving information at, displaying information on, and transmitting information from the computing device. A client application may function to implement a system wherein the front-end components communicate and cooperate with back-end components. The client application may include machine-readable instructions for implementing the user interface to allow a user to input commands to, and receive information from, the lifestyle preference locator system described herein. One of the plurality of applications may be a native web browser, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device or other back-end components while also receiving inputs from the user. Another application of the plurality of applications may include an embedded web browser that may be implemented as a series of machine-readable instructions for receiving, interpreting, and displaying web page information from the server device or other back-end components within the client application.

Another of the plurality of client applications or routines may include a match operating mode/module that determines the matching quality of user selected and prioritized lifestyle preferences with those of areas of interest, as described herein. The match operating mode may process rating data of lifestyle preferences from database to facilitate determining areas compatible with the user's selected and prioritized lifestyle preferences.

Another routine in the plurality of applications or routines may include a rate operating mode/module that enables the user to rate lifestyle preferences of desired areas, as described herein.

Yet another routine in the plurality of applications or routines may include an image capture routine that coordinates with the image capture device for use with one or more of the plurality of applications.

The user may also launch or instantiate any other suitable user interface application (e.g., the native web browser, or any other one of the plurality of software applications) to access the server device to implement the match operating mode and/or rate operating mode. Additionally, the may launch the client application from the computing device to access the server device to implement the lifestyle preference locator system.

After the information from the match operating mode and/or rate operating mode information has been gathered or determined by the computing device, the computing device may provide for the transmission of the information/results. For example, the transmitted results/information may be sent to a storage device and/or another individual to assist in the lifestyle preference locator system.

In embodiments where the computing device is a thin-client device, the server device may perform many of the processing functions remotely that may otherwise be performed by the computing device. In such embodiments, the server device may include a number of software applications capable of executing the match operating mode and/or the rate operating mode. For example, the computing device may gather selected and/or prioritized lifestyle preference information and send the information to the server device for remote processing. The server device may perform the analysis of the selected and/or prioritized lifestyle preference information with the lifestyle preference data associated with areas of interest to determine compatibilities of those areas as described herein. The server device may then determine a ranking of the interested areas. The server device may also transmit the determined ranking information to a storage location and/or another interested individual, such as a spouse, realtor, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additionally, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

Aspect 1: A method of providing graphical location-based information to a user via an interactive display screen of a computing device, the method comprising: providing, on the interactive display screen of the computing device, at least one selectable item, each selectable item corresponding to an operating mode, a lifestyle preference, a category of the lifestyle preference, and/or a prioritization level of a prioritization scale of the category of the lifestyle preference; displaying, on the interactive display screen of the computing device, a map of a geographic region in response to geographic location information, the map including at least one area associated with classified data of the lifestyle preference; receiving, on the interactive display screen of the computing device, selection of a match operating mode by the user; displaying, on the interactive display screen of the computing device, the selectable item corresponding to the category of the lifestyle preference based on the selection of the match operating mode by the user and the at least one area of the map; receiving, on the interactive display screen of the computing device, a selection of the category of the lifestyle preference by the user; displaying, on the interactive display screen of the computing device in response to the received selection of the category of the lifestyle preference, the prioritization scale associated with the received selection of the category of the lifestyle preference; receiving, on the interactive display screen of the computing device via the prioritization scale, the prioritization value of the category of the lifestyle preference selected by the user; analyzing, at the computing device, the prioritization value of the category of the lifestyle preference selected by the user with the classified data of the selected category of the lifestyle preference associated with the at least one area; ranking, at the computing device, the at least one area of the map displayed on the screen based on the analysis of the prioritization value of the category of the lifestyle preference selected by the user with the classified data of the category of the lifestyle preference associated with the at least one area; and indicating, on the interactive display screen of the computing device, the ranking of the least one area of the map displayed on the screen based on the analysis of the prioritization value of the category of the lifestyle preference selected by the user with the classified data of the category of the lifestyle preference.

Aspect 2: The method of aspect 1, wherein indicating the ranking includes displaying a descriptive border representative of the ranking proximate a perimeter of the at least one area of the map displayed on the screen.

Aspect 3: The method of any one of aspects 1-2, wherein the descriptive border includes a color, shade, and/or pattern.

Aspect 4: The method of any one of aspects 1-3, wherein the descriptive border includes a color, shade, and/or pattern.

Aspect 5: The method of any one of aspects 1-4, wherein indicating the ranking includes displaying a descriptive surface representative of the ranking over a surface within a perimeter of the at least one area of the map displayed on the screen.

Aspect 6: The method of any one of aspects 1-5, wherein ranking the at least one area includes meeting and/or exceeding a mandatory level of the prioritization value of the category of the lifestyle preference.

Aspect 7: The method of any one of aspects 1-6, wherein the geographic location information is provided by the user via the interactive display screen.

Aspect 8: The method of any one of aspects 1-7, wherein the geographic location information is automatically provided via a location positioning module.

Aspect 9: The method of any one of aspects 1-8, wherein the prioritization value of the category of the lifestyle preference selected by the user includes a mandatory designation.

Aspect 10: The method of any one of aspects 1-9, wherein the at least one selectable item includes a subcategory of the lifestyle preference, a prioritization level of a prioritization scale of the subcategory of the lifestyle preference, and the map includes at least one area associated with classified data of the subcategory of the lifestyle preference, the method further comprising: displaying, on the interactive display screen of the computing device, the selectable item corresponding to the subcategory of the lifestyle preference based on the selection of the match operating mode by the user and the at least one area of the map; receiving, on the interactive display screen of the computing device, a selection of the subcategory of the lifestyle preference by the user; displaying, on the interactive display screen of the computing device in response to the received selection of the subcategory of the lifestyle preference, the prioritization scale associated with the received selection of the subcategory of the lifestyle preference; receiving, on the interactive display screen of the computing device via the prioritization scale, the prioritization value of the subcategory of the lifestyle preference selected by the user; analyzing, at the computing device, the prioritization value of the subcategory of the lifestyle preference selected by the user with the classified data of the selected subcategory of the lifestyle preference associated with the at least one area; ranking, at the computing device, the at least one area of the map displayed on the screen based on the analysis of the prioritization value of the subcategory of the lifestyle preference selected by the user with the classified data of the subcategory of the lifestyle preference associated with the at least one area; and indicating, on the interactive display screen of the computing device, the ranking of the least one area of the map displayed on the screen based on the analysis of the prioritization value of the subcategory of the lifestyle preference selected by the user with the classified data of the subcategory of the lifestyle preference.

Aspect 11: The method of any one of aspects 1-10, wherein the at least one selectable item includes a rating level of a rating scale of the category of the lifestyle preference, the method further comprising: receiving, on the interactive display screen of the computing device, selection of a rate operating mode by the user; displaying, on the interactive display screen of the computing device, the map of a geographic region in response to geographic location information, wherein the map including the at least one area associated with classified data of the lifestyle preference; displaying, on the interactive display screen of the computing device, the selectable item corresponding to the category of the lifestyle preference based on the selection of the rate operating mode by the user and the at least one area of the map; receiving, on the interactive display screen of the computing device, a selection of the category of the lifestyle preference by the user; displaying, on the interactive display screen of the computing device in response to the received selection of the category of the lifestyle preference, the rating scale associated with the received selection of the category of the lifestyle preference; receiving, on the interactive display screen of the computing device via the rating scale, the rating value of the category of the lifestyle preference selected by the user; and storing the rating value of the category of the lifestyle preference with the classified data of the category of the lifestyle preference.

Aspect 12: The method of any one of aspects 1-11, wherein the at least one selectable item includes a rating level of a rating scale of the subcategory of the lifestyle preference, the method further comprising: displaying, on the interactive display screen of the computing device, the selectable item corresponding to the subcategory of the lifestyle preference based on the selection of the rate operating mode by the user and the at least one area of the map; receiving, on the interactive display screen of the computing device, a selection of the subcategory of the lifestyle preference by the user; displaying, on the interactive display screen of the computing device in response to the received selection of the subcategory of the lifestyle preference, the rating scale associated with the received selection of the subcategory of the lifestyle preference; receiving, on the interactive display screen of the computing device via the rating scale, the rating value of the subcategory of the lifestyle preference selected by the user; and storing the rating value of the subcategory of the lifestyle preference with the classified data of the subcategory of the lifestyle preference.

Aspect 13: A computing device capable of being coupled to a communication network and providing location-based information of one or more lifestyle preferences, the computing device comprising: one or more processors; a user interface including an interactive display screen; and a non-transitory computer-readable memory coupled to the one or more processors, the communication network, and the user interface, the non-transitory computer-readable memory including instructions stored thereon on that, when executed by the one or more processors, cause the computing device to: provide, on the interactive display screen of the computing device, at least one selectable item, each selectable item corresponding to an operating mode, a lifestyle preference, a category of the lifestyle preference, and/or a prioritization level of a prioritization scale of the category of the lifestyle preference; display, on the interactive display screen of the computing device, a map of a geographic region in response to geographic location information, the map including at least one area associated with classified data of the lifestyle preference; receive, on the interactive display screen of the computing device, selection of a match operating mode by the user; display, on the interactive display screen of the computing device, the selectable item corresponding to the category of the lifestyle preference based on the selection of the match operating mode by the user and the at least one area of the map; receive, on the interactive display screen of the computing device, a selection of the category of the lifestyle preference by the user; display, on the interactive display screen of the computing device in response to the received selection of the category of the lifestyle preference, the prioritization scale associated with the received selection of the category of the lifestyle preference; receive, on the interactive display screen of the computing device via the prioritization scale, the prioritization value of the category of the lifestyle preference selected by the user; analyze, at the computing device, the prioritization value of the category of the lifestyle preference selected by the user with the classified data of the selected category of the lifestyle preference associated with the at least one area; rank, at the computing device, the at least one area of the map displayed on the screen based on the analysis of the prioritization value of the category of the lifestyle preference selected by the user with the classified data of the category of the lifestyle preference associated with the at least one area; and indicate, on the interactive display screen of the computing device, the ranking of the least one area of the map displayed on the screen based on the analysis of the prioritization value of the category of the lifestyle preference selected by the user with the classified data of the category of the lifestyle preference.

A computer-readable storage media storing computer executable instructions for identifying locations with lifestyle preferences selected by a user, wherein the instructions when executed by one or more processors of a computing device including an interactive display screen, cause the one or more processors to: provide, on the interactive display screen of the computing device, at least one selectable item, each selectable item corresponding to an operating mode, a lifestyle preference, a category of the lifestyle preference, and/or a prioritization level of a prioritization scale of the category of the lifestyle preference; display, on the interactive display screen of the computing device, a map of a geographic region in response to geographic location information, the map including at least one area associated with classified data of the lifestyle preference; receive, on the interactive display screen of the computing device, selection of a match operating mode by the user; display, on the interactive display screen of the computing device, the selectable item corresponding to the category of the lifestyle preference based on the selection of the match operating mode by the user and the at least one area of the map; receive, on the interactive display screen of the computing device, a selection of the category of the lifestyle preference by the user; display, on the interactive display screen of the computing device in response to the received selection of the category of the lifestyle preference, the prioritization scale associated with the received selection of the category of the lifestyle preference; receive, on the interactive display screen of the computing device via the prioritization scale, the prioritization value of the category of the lifestyle preference selected by the user; analyze, at the computing device, the prioritization value of the category of the lifestyle preference selected by the user with the classified data of the selected category of the lifestyle preference associated with the at least one area; rank, at the computing device, the at least one area of the map displayed on the screen based on the analysis of the prioritization value of the category of the lifestyle preference selected by the user with the classified data of the category of the lifestyle preference associated with the at least one area; and indicate, on the interactive display screen of the computing device, the ranking of the least one area of the map displayed on the screen based on the analysis of the prioritization value of the category of the lifestyle preference selected by the user with the classified data of the category of the lifestyle preference.

What is claimed:

1. A computer-implemented method for providing graphical location-based information to a user via an interactive display screen of a computing device, the method comprising:

displaying, on the interactive display screen of the computing device, a map of a geographic region of interest;

displaying, at the interactive display screen of the computing device, a plurality of selectable items each corresponding to an operating mode that is independent of the plurality of selectable items and to one of a corresponding plurality of predefined categories of lifestyle preferences based upon both a first user selection indicating the operating mode and the geographic region of interest of the map, wherein each of the selectable items has a functionality determined based upon the operating mode from a plurality of functionalities of the selectable item associated with a plurality of operating modes;

receiving, at the interactive display screen of the computing device, a plurality of second user selections associated with respective lifestyle preferences from the user, wherein the second user selections indicate respective values associated with lifestyle preferences;

analyzing, by one or more processors, the values associated with the lifestyle preferences selected by the user with data regarding the lifestyle preferences associated with each of a plurality of geographic areas of the map;

determining, by the one or more processors, suitability levels of the plurality of geographic areas of the map based upon such analysis of the values and the data of the plurality of geographic areas of the map, wherein each suitability level comprises an aggregate level of a respective geographic area of the plurality of geographic areas based upon the values associated with the lifestyle preferences indicated by the plurality of second user selections; and displaying, on the interactive display screen of the computing device, one or more visual indicators associated with at least one of the plurality of geographic areas of the map based upon the respective suitability level determined for the geographic area, wherein the one or more visual indicators provide visual indications of a geographic extent of the geographic area within the map displayed on the interactive display screen.

2. The computer-implemented method of claim 1, wherein the one or more visual indicators comprise an overlay of a surface area of the geographic area within the map that differentiates the geographic area by one or more of a color, shade, or pattern.

3. The computer-implemented method of claim 1, wherein the first user selection comprises a selection of a match operating mode as the operating mode by the user.

4. The computer-implemented method of claim 1, wherein at least one of the plurality of second user selections comprises a selection of a prioritization value by the user from a prioritization scale representing a plurality of prioritization values for the respective one or more categories of the lifestyle preferences.

5. The computer-implemented method of claim 1, wherein the one or more visual indicators include a plurality of locations indicating points of interest associated with the lifestyle preferences selected by the user within the at least one of the plurality of geographic areas of the map displayed on the interactive display screen.

6. The computer-implemented method of claim 1, wherein:
at least one of the plurality of second user selections indicates a mandatory designation of the corresponding lifestyle preference; and
the suitability levels of the geographic areas of the map rate as unacceptable any of the geographic areas of the map that do not meet the respective lifestyle preference indicated as mandatory.

7. The computer-implemented method of claim 1, wherein the at least one of the plurality of geographic areas of the map comprises one of a district, neighborhood, or borough of a municipality.

8. The computer-implemented method of claim 1, further comprising:
determining, by the one or more processors, a location of the computing device; and
determining, by the one or more processors, the geographic region of interest based upon the location of the computing device.

9. The computer-implemented method of claim 1, wherein the graphical location-based information is provided to the user via a web browser displayed via the interactive display screen of the computing device.

10. A computer system for providing graphical location-based information to a user via an interactive display screen of a computing device, comprising:
one or more processors communicatively coupled to a communication network;
a user interface including an interactive display screen communicatively coupled to the one or more processors; and
a non-transitory computer-readable memory communicatively coupled to the one or more processors, the non-transitory computer-readable memory including executable instructions stored thereon on that, when executed by the one or more processors, cause the computer system to:
display a map of a geographic region of interest on the interactive display screen;
display a plurality of selectable items on the interactive display screen, each selectable item corresponding to an operating mode that is independent of the plurality of selectable items and to one of a corresponding plurality of predefined categories of lifestyle preferences based upon both a first user selection indicating the operating mode and the geographic region of interest of the map, wherein each of the selectable items has a functionality determined based upon the operating mode from a plurality of functionalities of the selectable item associated with a plurality of operating modes;
receive a plurality of second user selections associated with respective lifestyle preferences from the user at the interactive display screen, wherein the second user selections indicate respective values associated with lifestyle preferences;
analyze the values associated with the lifestyle preferences selected by the user with data regarding the lifestyle preferences associated with each of a plurality of geographic areas of the map;
determine suitability levels of the plurality of geographic areas of the map based upon such analysis of the values and the data of the plurality of geographic areas of the map, wherein each suitability level comprises an aggregate level of a respective geographic area of the plurality of geographic areas based upon the values associated with the lifestyle preferences indicated by the plurality of second user selections; and
display one or more visual indicators associated with at least one of the plurality of geographic areas of the map based upon the respective suitability level determined for the geographic area on the interactive display screen, wherein the one or more visual indicators provide visual indications of a geographic extent of the geographic area within the map displayed on the interactive display screen.

11. The computer system of claim 10, wherein the one or more visual indicators comprise an overlay of a surface area of the geographic area within the map that differentiates the geographic area by one or more of a color, shade, or pattern.

12. The computer system of claim 10, wherein at least one of the plurality of second user selections comprises a selection of a prioritization value by the user from a prioritization scale representing a plurality of prioritization values for the respective one or more categories of the lifestyle preferences.

13. The computer system of claim 10, wherein the one or more visual indicators include a plurality of locations indicating points of interest associated with the lifestyle preferences selected by the user within the at least one of the plurality of geographic areas of the map displayed on the interactive display screen.

14. The computer system of claim 10, wherein the executable instructions further cause the computer system to:
determine a location of the computing device; and
determine the geographic region of interest based upon the location of the computing device.

15. A tangible, non-transitory computer-readable storage medium storing computer-executable instructions for providing graphical location-based information to a user via an interactive display screen of a computing device that, when executed by one or more processors of a computer system, cause the computer system to:
display a map of a geographic region of interest on an interactive display screen;
display a plurality of selectable items on the interactive display screen, each selectable item corresponding to an operating mode that is independent of the plurality of selectable items and to one of a corresponding plurality of predefined categories of lifestyle preferences based upon both a first user selection indicating the operating mode and the geographic region of interest of the map, wherein each of the selectable items has a functionality determined based upon the operating mode from a plurality of functionalities of the selectable item associated with a plurality of operating modes;
receive a plurality of second user selections associated with respective lifestyle preferences from the user at the interactive display screen, wherein the second user selections indicate respective values associated with lifestyle preferences;

analyze the values associated with the lifestyle preferences selected by the user with data regarding the lifestyle preferences associated with each of a plurality of geographic areas of the map;

determine suitability levels of the plurality of geographic areas of the map based upon such analysis of the values and the data of the plurality of geographic areas of the map, wherein each suitability level comprises an aggregate level of a respective geographic area of the plurality of geographic areas based upon the values associated with the lifestyle preferences indicated by the plurality of second user selections; and display one or more visual indicators associated with at least one of the plurality of geographic areas of the map based upon the respective suitability level determined for the geographic area on the interactive display screen, wherein the one or more visual indicators provide visual indications of a geographic extent of the geographic area within the map displayed on the interactive display screen.

16. The tangible, non-transitory computer-readable storage medium of claim 15, wherein the one or more visual indicators comprise an overlay of a surface area of the geographic area within the map that differentiates the geographic area by one or more of a color, shade, or pattern.

17. The tangible, non-transitory computer-readable storage medium of claim 15, wherein at least one of the plurality of second user selections comprises a selection of a prioritization value by the user from a prioritization scale representing a plurality of prioritization values for the respective one or more categories of the lifestyle preferences.

18. The tangible, non-transitory computer-readable storage medium of claim 15, wherein the one or more visual indicators include a plurality of locations indicating points of interest associated with the lifestyle preferences selected by the user within the at least one of the plurality of geographic areas of the map displayed on the interactive display screen.

19. The tangible, non-transitory computer-readable storage medium of claim 15, wherein the at least one of the plurality of geographic areas of the map comprises one of a district, neighborhood, or borough of a municipality.

20. The tangible, non-transitory computer-readable storage medium of claim 15, wherein the executable instructions further cause the computer system to:

determine a location of the computing device; and determine the geographic region of interest based upon the location of the computing device.

* * * * *